United States Patent [19]

Steinman

[11] Patent Number: 4,955,125

[45] Date of Patent: Sep. 11, 1990

[54] METHOD OF FORMING A PIZZA GRILL

[76] Inventor: Gerald W. Steinman, 417 Runnymede, St. Louis, Mo. 63141

[21] Appl. No.: 456,461

[22] Filed: Dec. 26, 1989

[51] Int. Cl.⁵ .................. B21D 39/02; A47J 27/00; A47J 36/00; A21B 3/13
[52] U.S. Cl. .................................. 29/509; 99/450; 99/432; 99/DIG. 15
[58] Field of Search ................ 99/450, 393, DIG. 15, 99/432, 426; 29/163.6, 163.7, 163.8, 432.1, 428, 425, 422, 469, 505, 505.5, 509, 513

[56] References Cited

U.S. PATENT DOCUMENTS

| | | | |
|---|---|---|---|
| 41,475 | 2/1864 | Brewster | 99/450 |
| 2,135,782 | 11/1938 | McBirney | 99/450 |
| 2,179,512 | 11/1939 | McBirney | 99/450 |
| 3,347,181 | 10/1967 | Pizzo | 99/450 |

Primary Examiner—Philip R. Coe
Assistant Examiner—Gary Graham
Attorney, Agent, or Firm—Paul M. Denk

[57] ABSTRACT

A pizza supporting and baking grid structure or pizza grill is disclosed as including a self-supporting metal screen having opposed faces and an outer periphery. The metal screen preferably has an open-mesh expanded metal construction. A circumferentially continuous one-piece rim extends about the outer periphery of the screen including opposed faces of the screen which are proximate to the outer periphery thereof. The rim has a generally flat annular rim section and an integral generally upstanding rim section which is re-shaped following assembly and juxtaposition of the screen relative to the generally flat annular rim section. The re-shaping of the integral generally upstanding rim section causes it to be moved into generally opposed and parallel relationship relative to the generally flat annular rim section so as to capture the screen therebetween. In this way, a circumferentially strengthened rim with an easy-to-clean and circumferentially continuous outer rim surfaces surrounding the screen is provided.

8 Claims, 2 Drawing Sheets

U.S. Patent   Sep. 11, 1990   Sheet 1 of 2   4,955,125
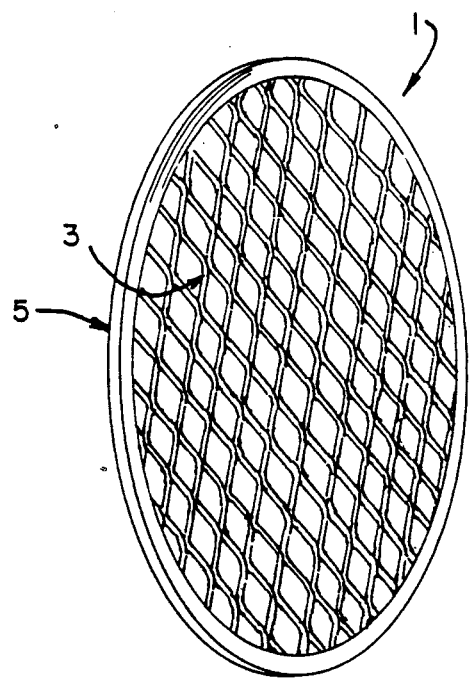
FIG.1.
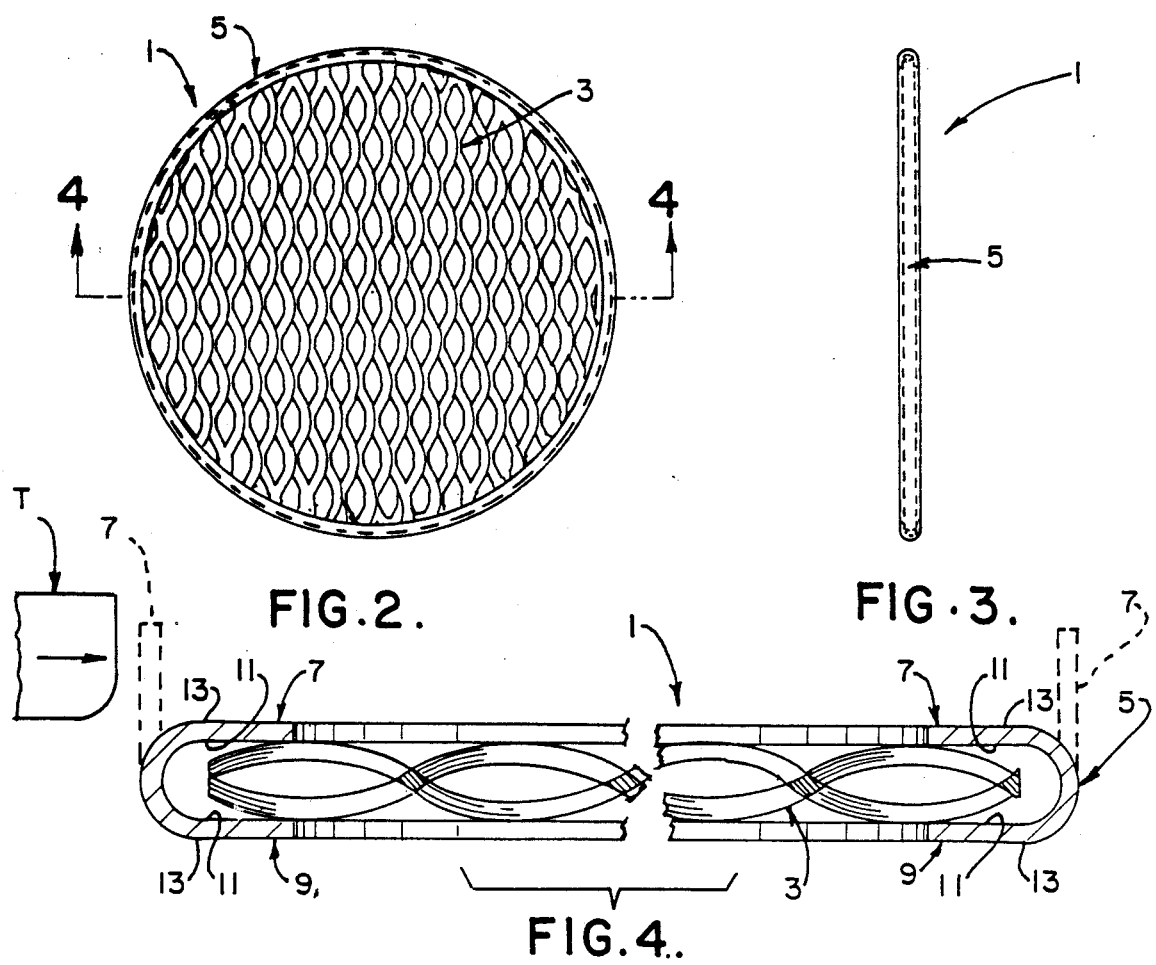
FIG.2.
FIG.3.
FIG.4.

METHOD OF FORMING A PIZZA GRILL

BACKGROUND OF THE INVENTION

The present invention relates to a pizza supporting and baking grid structure or pizza grill having a circumferentially continuous strengthened rim also facilitating cleaning thereof, as well as to the method of forming same.

Pizza grills are typically formed with a self-supporting metal screen of open mesh expanded metal construction which are surrounded by a wrap-around skirt or rim serving as edging for the screen and providing necessary structural support. The wrap-around skirt or rim is formed as a one-piece element where the opposite free ends thereof, after being wrapped around the screen, are secured by various fastening techniques including rivets, bolts, welds and other similar equivalent metal fastening systems. While such fastening techniques have worked well in mechanically locking the wrap-around skirt or rim into conformed relationship around the outer periphery of the screen, health official have become concerned because such fastening techniques, including the overlapped or interconnected free ends of the wrap-around skirt or rim, have various openings, ridges, fractured metal edges, and other deformations where food can be lodged or trapped. Also, metal pieces have detrimentally flaked off and have adulterated the pizza. As a result, the potential for food contamination, resulting in various physiological injury and intestinal ailments, has created the need for a new and improved product which does not have these inherent problems.

From an economical, manufacturing, and long term use standpoint, the current expanded metal screen with wrap-around skirts are simple and easy make and use, and are quite economical and long lasting. Yet, unless the health contamination problem can be overcome, these important advantages in such pizza grill constructions may be no longer available.

I have discovered a new and improved feature and related method of manufacture which can be incorporated into a wrap-around skirt or rim for metal screens in pizza grills, thereby retaining all of the advantages of such pizza grill constructions, while eliminating the aforementioned health and contamination problems.

SUMMARY OF THE INVENTION

Among the several objects and advantages of the present invention include:

The provision of a new and improved pizza supporting and baking grid structure including a screen and wrap-around skirt or rim which incorporates specific needed improvements to overcome health and contamination problems which have been created in the use of prior art designs;

The provision of the aforementioned pizza supporting and baking grid structure which includes a continuous, one-piece wrap-around skirt or rim that provides all of the structural strength required with easy-to-clean rim surfaces so as to avoid health and contamination in the wrap around skirt or rim;

The provision of the aforementioned pizza supporting and baking grid structure which can be manufactured with unique product-by-process improvements so as to provide the desired grid structure;

The provision of the aforementioned pizza supporting and baking grid structure which includes pre-assembly and forming steps, including re-shaping part of the wrap-around skirt or rim, to provide the continuous, on-piece rim structure desired;

The provision of aforementioned pizza supporting and baking grid structure wherein a rim is die cut from sheet material, and the remaining die cut blank within the rim available for use in the subsequent manufacture of smaller supporting and baking grid structures; and The provision of the aforementioned pizza supporting and baking grid structure and related method for manufacturing which can be readily and easily adapted and utilized in existing prior art designs and methods without losing any of the advantages inherent in such prior art designs and methods.

Briefly stated, the pizza supporting and baking grid structure of the present invention includes a self-supporting metal screen having opposed faces and an outer periphery. A circumferentially continuous one-piece rim extends about the outer periphery of the screen including opposed faces of the screen proximate the outer periphery thereof. The rim includes generally opposed and spaced rim sections with inner and outer rim surfaces. The inner rim surfaces of the opposed and parallel spaced rim sections being in contact in engagement with the opposed faces of the screen while the outer rim surfaces are substantial co-planar with respective opposed faces of the screen, thereby providing a circumferentially strengthened rim with easy-to-clean circumferentially continuous outer rim surfaces surrounding the screen.

The metal screen preferably has an open-mesh expanded metal construction, and the outer periphery of the screen and the rim have complementary configured cylindrical shapes. When assembled to the screen, the rim has a generally uniform U-shaped cross sectional configuration throughout its peripheral extent, and the generally opposed and parallel rim sections are formed in close conforming relationship to the open mesh expanded metal screen.

As initially constructed, the rim includes a generally flat annular rim section and an integral generally upstanding rim section which is re-shaped following assembly and juxtaposition of the screen relative to the generally flat annular rim section causing the integral generally upstanding rim section to be moved into generally opposed and parallel relationship relative to the generally flat annular rim sections so as to capture the screen therebetween.

The procedural steps utilized in forming a pizza supporting and baking grid structure with a circumferentially continuous supporting rim includes: forming a one-piece generally flat annular rim section with an integral generally upstanding annular rim section, forming a complementary configured self-supporting metal screen having a pre-configured outer periphery for complementary association relative to the generally flat and upstanding rim sections, assembling the screen relative to the annular rim sections with its outer periphery resting upon the generally flat annular rim section, and thereafter re-shaping the upstanding annular rim section to a generally opposed and parallel relationship to the generally flat rim section so as to capture the screen therebetween.

The re-shaping step further includes forcing the generally opposed and parallel rim sections into close conforming and contacting engagement relative to the screen. Specifically, the upstanding annular rim section is re-shaped by circumferentially bending same beginning adjacent the juncture with the generally flat annular rim section, the re-shaping taking place by use of a spinning tool engaging the upstanding annular rim section along the outer periphery thereof.

The one-piece generally flat annular rim section and integral generally upstanding annular rim section are formed by being first die cut from sheet material as a generally flat annular member and thereafter being re-formed with the generally flat annular rim section and integral generally upstanding annular rim section. The die-cutting and re-forming steps for the generally flat annular rim section and integral generally upstanding rim sections take in sequential steps without interruption at a single work station.

The die cut sheet material blank within the generally flat annular rim section and integral generally upstanding annular rim section is used as a sheet material blank for forming at least one more smaller generally flat annular rim section and integral generally upstanding rim section for use in a smaller pizza supporting and baking grid structure. Preferably, there are at least three different sizes of rims for pizza supporting and baking grid structures that are formed from a single piece of sheet material.

These and other objects and advantages of the present invention will become apparent from the ensuing description.

BRIEF DESCRIPTION OF THE DRAWINGS

In the drawings, FIG. 1 is an isometric view of a pizza supporting and baking grid structure or pizza grill constructed in accordance with the teachings of the present invention;

FIG. 2 is a top plan view thereof;

FIG. 3 is a side elevational view thereof;

FIG. 4 is an enlarged fragmentary sectional view as viewed along lines 4—4 of 2;

Corresponding reference numerals will be used throughout various figures of the drawings.

BRIEF DESCRIPTION OF THE PREFERRED EMBODIMENT

Figure 5A:
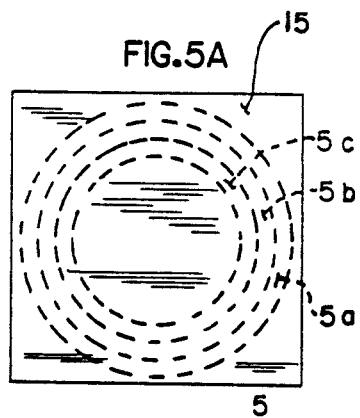
FIG. 5 is an exploded diagrammatic view illustrating the various procedural steps utilized in the method for forming the pizza supporting and baking grid structure or pizza grill of the present invention.
Figure 6A:
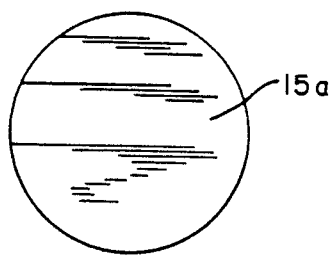
FIG. 6 is also an exploded diagrammatic view illustrating the various procedural steps, but showing the formation of a smaller pizza supporting and baking grid structure or pizza grill from a sequentially die cut material blank remaining after the formation of the larger sized pizza supporting and baking grid structure or pizza grill illustrated in FIG. 5 of the drawings.
Figure 7A:
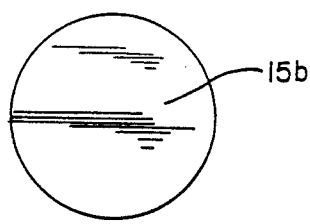
FIG. 7 is further exploded diagrammatic view illustrating an even smaller continuous rim for use with smaller pizza supporting and baking grid structure, also formed from remaining smaller die cut blank material portions, as will be evident.
Figure 5B:
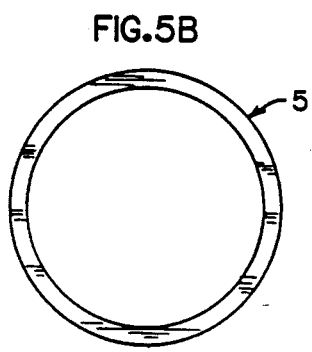
Figure 6B:
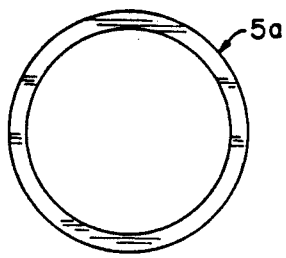
Figure 7B:
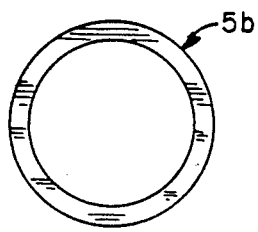
Figure 5C:
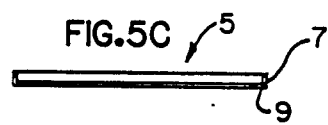
Figure 6C:
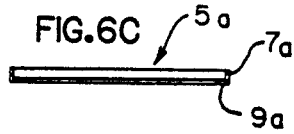
Figure 7C:
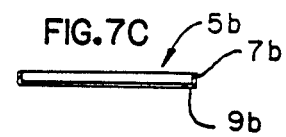
Figure 5D:
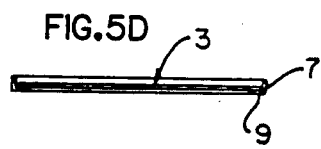
Figure 6D:
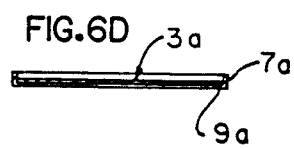
Figure 7D:
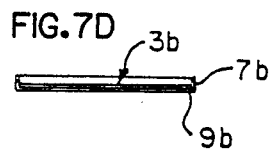
Figure 5E:
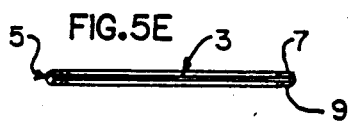
Figure 6E:
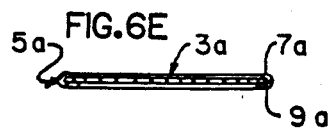
Figure 7E:
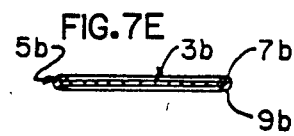

The following detailed description illustrates the invention by way of example, and not by way of limitation. This description will clearly enable one skilled in the art to make and use the invention, and describes several embodiments, adaptions, variations, alternatives and uses of the invention, including what I presently believe is the best mode of carrying out the invention.

The pizza supporting and baking grid or grill structure 1 shown in the drawings allows un-cooked pizza (not shown) to be placed thereon for insertion into an oven for cooking. When cooking is completed, the pizza grid or grill structure 1 is removed from the oven, and pizza (not shown) is removed from the grid or grill structure 1, allowing the grill or grid structure 1 to be re-used, as needed.

The pizza grid or grill structure 1 includes a self-supporting metal screen 3 preferably made of an open-mesh expanded metal construction, as illustrated in the drawings. The self-supporting metal screen 3 is formed in a circular or cylindrical construction with opposed faces on opposite sides thereof and an outer periphery comprising the jagged ends or edges of the expanded metal segments that may cut or otherwise injure a user, if left uncovered.

That is why the rim element 5 is provided. It not only covers these jagged and exposed metal edges of the self-supporting screen 3, but also provides circumferential strengthening rim to prevent undesirable deformation or deflection of the metal screen 3, as will be apparent.

As is explained above, the wrap-around skirt or rim of prior art devices comprise a one-piece element having opposite free ends thereof attached by various fastening techniques. Since this creates undesirable food collection areas, presenting health and food contamination problems, the present invention overcomes these problems in the circumferentially continuous one-piece rim 5 shown in the drawings which is shown as extending about the outer periphery of the screen 3, including opposed faces of the screen 3 proximate the outer periphery thereof.

More specifically, the circumferentially continuous one-piece rim 5 includes generally opposed and parallel spaced rim sections 7, 9 having spaced and parallel inner and outer rim surfaces 11, 11 and 13, 13 respectively. This is best seen in FIG. 4 of the drawings where the upper and lower inner rim surfaces 11, 11 of the opposed and parallel rim sections 7, 9 are in contacting engagement with the opposed faces of the screen 3, while the outer rim surfaces 13, 13 of the opposed and parallel spaced rim sections 7, 9 are substantially co-planar with (although being slightly outwardly offset from) the respective opposed faces of the screen 3.

When the circumferentially continuous one-piece rim 5 is assembled relative to the metal or mesh screen, the rim, as best seen in FIG. 4, will assume a generally uniform U-shaped cross sectional configuration throughout its peripheral extent. Also, the generally opposed and parallel rim sections 7, 9 are formed in close conforming relationship to the open mesh expanded metal screen along the opposed faces thereof, in proximity to the outer periphery of the screen or in direct engagement and support of the screen in functioning in the manner desired.

The circumferentially continuous one-piece rim 5 thereby provides a circumferentially strengthen rim for the pizza grid or grill structure 1, while preventing deformation or deflection of the self-supporting metal screen 3, and at the same time, providing easy-to-clean outer circumferentially continuous rim surfaces 13, 13, thus eliminating the food contamination and health problems associated with prior art rivet fastened wrap-around skirt or rim devices.

Figure 5:
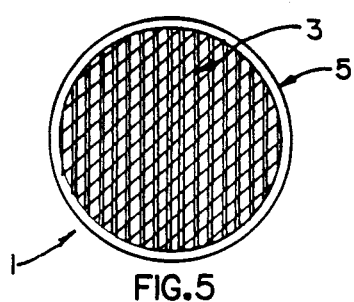
Figure 6:
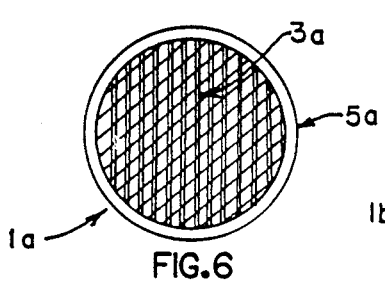
Figure 7:
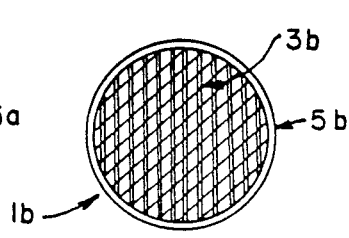

Reference is now made to FIGS. 5-7 of the drawings for a description of the method forming the pizza supporting and baking grid or grill structure 1 with the circumferentially continuous supporting rim 5. Each of FIGS. 5–7 show exploded diagrammatic views of different sizes of pizza grid or grill structures that are formed, and in order to understand the direct comparison between the same parts in the different figures varying only in size, the same reference numeral is used with a different suffix, "a" in FIG. 6, and "b" in FIG. 7, to distinguish from parts of various sizes in each of FIGS. 5–7.

It will be seen in FIG. 5 that the circumferentially continuous one-piece rim 5 for the pizza grid or grill structure 1 of largest size; in FIG. 6 for the circumferentially continuous one-piece rim 5a for the medium size pizza grid or grill structure 1a; and, in FIG. 7, the circumferentially continuous one-piece rim 5b for the smallest pizza grid or grill structure 1b are each die cut from a single sheet of a continuous metal sheet 15, as shown by the dotted line representations rim 5a, 5b and 5c.

A typical representative size of large, medium and small pizza grid or grill structures have the dimensions of 16" in diameter, 12" in diameter and 8" in diameter, respectively, although other diameters have been used for various large, medium and small pizza grid or grill structures. These representative large, medium and small sizes do, however, indicate how it is possible to utilize remaining sheet material portions such as die cut blank 15a from within circumferentially continuous one-piece rim 5a, from which the circumferentially continuous one-piece rim 5a may be formed, and similarly, the remaining die cut blank 15b within the rim 5b can be used to form the smaller circumferentially continuous one-piece rim 5c, as shown in FIGS. 5–7 of the drawings.

Once the flat die-cut blank 5 or 5a or 5b is formed, as represented by the dotted line concentric circles shown in FIG. 5 of the drawings (stage A), the next step is to form the circumferentially continuous and integral one-piece rim 5 or 5a or 5b (stage B) with a generally flat annular rim section 9 or 9a or 9b with an integral generally upstanding annular rim section 7 or 7a or 7b, for each of the three sizes (state C). This can be done during the punching process when each size rim is being stamped, so that a punch operation not only puts out the next smaller rim size, but simultaneously forms the horizontal flanges 9, 9a and 9b, and bends into the vertical configuration the integral flanges 7, 7a and 7b, as noted at C.

At a separate station, a complementary configured self-supporting metal screen having a pre-configured and pre-dimensioned outer periphery is formed for complementary association relative to the generally flat and upstanding annular rim sections 7, 9 or 7a, 9a or 7b, 9b, depending on the size. The self-supporting metal screen 3 is thus capable of resting upon the generally flat annular rim section 9 or 9a or 9b, in each instance while fitting within the general confines of the generally upstanding annular section 7 or 7a or 7b, in each instance.

As shown in each of FIG. 5–7, once the self-supporting metal screen 3 or 3a or 3b assembled, as at station D in each of FIGS. 5–7, it is now possible to re-shape the generally upstanding annular rim section 7 or 7a or 7b in each of the three different sizes so as to be positioned in a generally opposed and parallel relationship to the generally flat rim section 9 or 9a or 9b in each instance. This is shown in stage E of FIGS. 5–7.

As described above, the desired position of the generally opposed and parallel rim sections 7, 9 are such that they will be in contacting and conforming engagement relative to the opposed faces of the self-supporting metal screen to provide circumferential strengthening support, while minimizing deformation or deflection thereof. The bottom view in each of FIGS. 5–7 is a top plan view of the completely assembled pizza grid or grill structure 1 or 1a or 1b, illustrating the three different sizes of pizza grid or grill structures that may be formed with a circumferentially continuous one-piece rim 5, or 5a, or 5b from the single sheet metal piece 15 illustrated at the upper left hand corner of FIG. 5.

FIG. 4 is an enlarged illustration depicting the manner in which the generally upstanding annular rim section 7 is re-shaped from a generally vertical to a generally horizontal position for contacting and conforming engagement with the opposed faces of the self-supporting metal screen 3.

In the preferred method the die-cutting and re-forming steps, that is, stages A, B and C in each of FIG. 5–7 of the drawings, take place in sequential steps, but preferably without interruption at a single work station. This is possible by first die cutting each of the blanks to ultimately form the circumferentially continuous one-piece rim 5 or 5a or 5b in each embodiment, and thereafter moving the die-cut blank in the same die to a lower position where the forming step can take place to form the flat annular rim section 9 or 9a or 9b with the generally upstanding rim section 7 or 7a or 7b, in each instance.

It will be understood that the upstanding annular rim section 7 or 7a or 7b in each embodiment is re-shaped by circumferentially bending each of the rim sections beginning adjacent the juncture with the generally flat annular rim section 9 or 9a or 9b in each instance. Preferably, this re-shaping step is performed through the use of a spinning tool, as shown at T, and as known in the art, which engages the outer periphery of each upstanding annular rim section 7 or 7a or 7b, while rotating and deforming same until re-shaped into its generally opposed and parallel relationship to the generally flat annular rim sections 9 or 9a or 9b, in each instance. Other methods for re-shaping the generally upstanding rim section 7 or 7a or 7b may be used, if desired.

From the foregoing, it will now be appreciated that the present invention discloses a novel pizza supporting and baking grid or grill structure with a circumferentially continuous one-piece rim, along with a method for forming same, including forming a series of preferably three different sized circumferentially continuous one-piece rims from the same piece of sheet material, for complementary association with complementary sized metal screens for forming the pizza grid or grill structure, as may be desired.

In view of the above, it will be seen that the several objects and features of this invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

I claim:

1. The method of forming a pizza supporting and baking grid structure with a circumferentially continuous supporting rim, comprising the steps of:

forming a one-piece generally flat annular rim section with an integral generally upstanding annular rim section, forming a complementary configured self-supporting metal screen having a pre-configured outer periphery for complementary association relative to said generally flat and upstanding annular rim sections, assembling said screen relative to said annular rim sections with its outer periphery resting upon the generally flat annular rim section, and thereafter re-shaping by spin processing said upstanding annular rim section into generally opposed and parallel relationship to said generally flat rim section so as to capture said screen therebetween.

2. The method as defined in claim 1 wherein said re-shaping step further includes forcing said generally opposed and parallel rim sections into close conforming and contiguous engagement relative to said screen.

3. The method as defined in claim 2 wherein said die-cutting and re-forming steps for said generally flat annular rim section and integral generally upstanding rim section take place in sequential steps without interruption at a single work station.

4. The method as defined in claim 3 wherein the upstanding annular rim section is re-shaped by spinning through application of a tool along the outer periphery of the spinning rim thereof until re-shaped into its generally opposed and parallel relationship to said generally flat annular rim section.

5. The method as defined in claim 4 wherein there are at least three different sizes of rims for pizza supporting and baking grid structure that are formed from a single piece of sheet material.

6. The method as defined in claim 2 wherein the die cut sheet material within the previously formed generally flat annular rim section is used as a sheet material blank for forming at least one more smaller generally flat annular rim section and integral generally upstanding annular rim section for use in a smaller pizza supporting and baking grid structure.

7. The method as defined in claim 1 wherein said one-piece generally flat annular rim section and integral generally upstanding annular rim sections are formed by being first die cut from sheet material as a generally flat annular member and is thereafter re-formed with said generally flat annular rim section and integral generally upstanding annular rim section.

8. The method as defined in claim 7 wherein the upstanding annular rim section is re-shaped by circumferentially bending same beginning adjacent the juncture with said generally flat annular rim section.

* * * * *